US011379568B2

(12) United States Patent
Ram (10) Patent No.: US 11,379,568 B2
(45) Date of Patent: Jul. 5, 2022

(54) METHOD AND SYSTEM FOR PREVENTING UNAUTHORIZED COMPUTER PROCESSING

(71) Applicant: Dan Ram, Binyamina (IL)

(72) Inventor: Dan Ram, Binyamina (IL)

( * ) Notice: Subject to any disclaimer, the term of this patent is extended or adjusted under 35 U.S.C. 154(b) by 112 days.

(21) Appl. No.: 17/012,473

(22) Filed: Sep. 4, 2020

(65) Prior Publication Data

US 2020/0401679 A1 Dec. 24, 2020

Related U.S. Application Data

(63) Continuation of application No. 15/897,322, filed on Feb. 15, 2018, now Pat. No. 10,803,155, which is a
(Continued)

(51) Int. Cl.
*G06F 21/31* (2013.01)
*G06F 21/44* (2013.01)
(Continued)

(52) U.S. Cl.
CPC .......... *G06F 21/316* (2013.01); *G06F 21/445* (2013.01); *G06F 21/566* (2013.01); *H04L 9/30* (2013.01)

(58) Field of Classification Search
CPC .... G06F 21/316; G06F 21/445; G06F 21/566; G06F 21/56; G06F 21/31; G06F 21/44; H04L 9/30
See application file for complete search history.

(56) References Cited

U.S. PATENT DOCUMENTS 5,909,589 A * 6/1999 Parker .................... G09B 5/065
726/16
6,151,593 A 11/2000 Cho et al.
(Continued)

FOREIGN PATENT DOCUMENTS

GB 2502660 A 12/2013

OTHER PUBLICATIONS

Teng et al., "Adaptive Real-Time Anomaly Detection Using Inductively Generated Sequential Patterns", Proceedings of the Symposium on Research in Security and Privacy. Oakland, May 7, 9, 1990; [Proceedings of the Symposium on Research in Security and Privacy], May 7, 1990 Los Alamitos, IEEE Comp. Soc. Press, US—ISBN 978-0-8186-2060-7 ; ISBN 0-8186-2060-9; NPL reference No. XP000209258; vol. SYMP, 11, pp. 278-284.
(Continued)

*Primary Examiner* — Techane Gergiso
(74) *Attorney, Agent, or Firm* — The Roy Gross Law Firm, LLC; Roy Gross (57) ABSTRACT

The invention relates to a system and method for preventing a protected computing device from executing unauthorized processor commands. A data entry database of the system stores encoded data entered by a human user as data entry events. A command verification module of the system implements an authentication algorithm for determining whether a processor command to be executed by the computing device originates from a trusted source. The command verification module determines the trustworthiness of a processor command as a function of parameters of the processor command, which include an association of the command with one or more of the data entry events. Determination can also be made based on other processor command parameters, such as the type of processor command and/or contextual parameters of the processor command. Upon making the determination, the command verification module allows authenticated processor commands to be executed and prevents non-authenticated processor commands from being executed by the computing device.

18 Claims, 2 Drawing Sheets

Related U.S. Application Data continuation-in-part of application No. PCT/IL2016/050898, filed on Aug. 17, 2016.

(60) Provisional application No. 62/205,767, filed on Aug. 17, 2015.

(51) Int. Cl.
*H04L 9/30* (2006.01)
*G06F 21/56* (2013.01)

(56) References Cited

U.S. PATENT DOCUMENTS

| | | | |
|---|---|---|---|
| 7,979,889 B2 | 7/2011 | Gladstone et al. | |
| 8,595,834 B2 | 11/2013 | Xie et al. | |
| 8,640,243 B2 | 1/2014 | Kaufman | |
| 8,713,683 B2* | 4/2014 | Moore | G06F 21/71 726/25 |
| 8,868,927 B1 | 10/2014 | Lee | |
| 8,914,895 B1* | 12/2014 | Katz | G06F 21/645 713/187 |
| 9,363,260 B2* | 6/2016 | Spaulding | G06F 21/36 |
| 9,773,240 B1 | 9/2017 | McCauley | |
| 9,785,771 B1* | 10/2017 | Pratt | G06F 21/554 |
| 2003/0226016 A1 | 12/2003 | Challener | |
| 2004/0002902 A1 | 1/2004 | Muehlhaeuser | |
| 2004/0268133 A1 | 12/2004 | Lee | |
| 2006/0156380 A1 | 7/2006 | Gladstone et al. | |
| 2006/0242424 A1* | 10/2006 | Kitchens | G06F 21/32 713/183 |
| 2007/0245036 A1 | 10/2007 | Fekih-Romdhane | |
| 2008/0162784 A1 | 7/2008 | Obereiner et al. | |
| 2009/0049307 A1 | 2/2009 | Lin | |
| 2009/0199296 A1* | 8/2009 | Xie | G06F 21/554 726/23 |
| 2009/0292924 A1* | 11/2009 | Johnson | G06F 21/316 713/176 |
| 2011/0265038 A1 | 10/2011 | Okogun | |
| 2013/0144792 A1 | 6/2013 | Nilsson | |
| 2013/0263240 A1* | 10/2013 | Moskovitch | G06F 21/32 726/7 |
| 2013/0347099 A1* | 12/2013 | Smith | G06F 21/32 726/19 |
| 2014/0283007 A1* | 9/2014 | Lynch | G06F 21/316 726/17 |
| 2014/0373139 A1 | 12/2014 | Fu et al. | |
| 2015/0363590 A1 | 12/2015 | Patel | |
| 2016/0050217 A1* | 2/2016 | Mare | H04L 63/08 726/4 |
| 2016/0371479 A1 | 12/2016 | William | |

OTHER PUBLICATIONS

International Search Report, International Application No. PCT/IL2016/050898, dated Dec. 12, 2016 (three pages).

U.S. Appl. No. 15/897,322, filed Feb. 15, 2018.

Teng, H.S., Chen, K. & Lu, S.C. (1990). Adaptive real-time anomaly detection using inductively generated sequential patterns. In: Research in Security and Privacy, 1990. Proceedings., IEEEComputer Society Symposium on IEEE., p. 278-284. Doi: 10.1109/RISP.1990.63857.

PCT International Search Report for International Application No. PCT/IL2016/050898, dated Dec. 12, 2016, 4pp.

PCT Written Opinion International Application No. PCT/IL2016/050898, dated Dec. 12, 2016, 6pp.

PCT International Preliminary Report on Patentability for International Application No. PCT/IL2016/050898, completed Nov. 29, 2017, 33pp.

* cited by examiner

METHOD AND SYSTEM FOR PREVENTING UNAUTHORIZED COMPUTER PROCESSING

CROSS-REFERENCE TO RELATED APPLICATIONS

This application is a continuation application of U.S. patent application Ser. No. 15/897,322, filed on Feb. 15, 2018, which is a continuation-in-part application of International Application No. PCT/IL2016/050898, filed on Aug. 17, 2016, which claims the benefit of priority under 35 U.S.C. § 119(e)(1) of U.S. Provisional Application Ser. No. 62/205,767, filed on Aug. 17, 2015, the entire contents of each of which are incorporated herein by reference.

FIELD OF THE INVENTION

The present invention pertains to fields of data security, computing devices, computer communication, and encryption.

BACKGROUND OF THE INVENTION

Computer security has become extremely important as computers (a) become increasingly utilized in almost every realm of human activity, and (b) are increasingly networked in large, largely unsecured global networks.

The challenge of securing computer networks has also increased, as malicious entities become more sophisticated and ruthless. Computer systems in every networked context, including personal systems, financial systems, industrial systems, medical systems, and even government and defense systems, are threatened by the digital information damage of cyber-warfare and cyber-crime, on the parts of international bad actors and organized crime.

The potential damage of malicious computer crime, including viruses and worms as well as data theft and system manipulation, extends far beyond the data residing on computers. Financial institutions, and their computer systems, constantly manage billions of dollars' worth of monetary and other assets. Malicious entities might not only obtain confidential financial information, but also manipulate these systems to rob entities of their assets or even wreak havoc on real economies. An attack on a nation's computer-controlled energy grid might completely halt all activity dependent upon electricity, resulting in an inability to provide even the most basic goods and services to a population. Goods and services might include food, medicine, heating and cooling, and essential medical services like operations and electricity-dependent treatments.

The computer security sector has also advanced over time and several solutions have been offered. For example, U.S. Patent Application #20090049307 to Lin, hereinafter "Lin," "A System and Method for Providing a Multifunction Computer Security USB Token Device." As described in the application, the invention "discloses a small token device . . . which can plug into the USB interface of a host computer, which need not be fully trusted, and handle a variety of different security functions. The device is capable of serving as a secure USB hub, and thus can function on a host computer that only has one available USB port. Among the multiple functions that the device can perform include communicating through the Internet in a secure manner, storing data in a secure manner, and access secure information through public key (PKI) methods. The invention also allows secure USB peripherals to maintain security while being hooked up to either a non-secure host computer or other non-secure USB peripherals."

A key shortcoming of Lin is that, while it does secure USB-based communication in the computer system, as well as provide security measures for communication between the computer and larger networks, it is does not address the problem of malicious instructions already resident in the computer system. It does not evaluate commands to be forwarded to the host computer's microprocessor for suspicious qualities nor does it examine contextual factors which might indicate whether the source of the processor commands is authorized or trustworthy. While Lin safeguards communication to and from external sources, to make sure that data is communicated without corruption, it does not safeguard the host computer from non-corrupted data which comprises malicious code sent by the communication's external source.

There is therefore an unmet need to provide improved computer protection that includes processor command monitoring and validation.

SUMMARY OF THE INVENTION

It is thus one object of the present invention to disclose a system [100] for preventing a protected computing device [300] from executing unauthorized processor commands, the system [100] comprising:
  a. a data entry encoding module [120] for encoding data entered by a human user [500];
  b. a data entry database [250]; and
  c. a command verification module [130];
wherein data entered by the human user [500] via a data entry device [110] and the time of data entry, the "data entry timestamp" [140], are encoded by the data entry encoding module [120] as a data entry event [270] and stored in the data entry database [250];
wherein the command verification module [130] implements an authentication algorithm [210] for determining whether a processor command [260], to be executed by the protected computing device [300], originates from a trusted source;
wherein the command verification module [130] determines the trustworthiness of a processor command [260] as a function of processor command parameters selected from a group comprising:
  i. the type of processor command [260] to be executed by the protected computing device [300] (e.g., memory operation, data processing operation);
  ii. contextual parameters of the processor command [260], the parameters selected from a group comprising the specific computer process that called the processor command [260] (e.g., operating system, office productivity application, communication application, security application); and
  iii. association of the processor command [260] with one or more specific data entry events [270] encoded by the data encoding module [120] and stored in the data entry database [250];
wherein the command verification module [130] allows authenticated processor commands to be executed by the protected computing device [300];
wherein the command verification module [130] prevents the protected computing device [300] from executing processor commands [260] determined to be non-authenticated.

It is thus one object of the present invention to disclose a system [100] for preventing a protected computing device [300] from executing unauthorized processor commands, the system [100] comprising:

It is another object of the present invention to disclose the system [100] mentioned above, wherein the data entry encoding module [120] encrypts the data entry event [270] data; further wherein the data command verification module [130] decrypts the encrypted data entry event [270] as trusted data entered by a human user [500] by means of the data entry device [110].

It is another object of the present invention to disclose the system [100] mentioned above, wherein the encryption method is selected from a group comprising public-key encryption and shared-key encryption.

It is another object of the present invention to disclose the system [100] mentioned above, wherein the data entry device [110] comprises a keyboard; wherein the data entry event [270] comprises parameters selected from a group comprising keystroke identification and a data entry timestamp [140].

It is another object of the present invention to disclose the system [100] mentioned above, wherein the data entry device [110] is selected from a group of pointing devices comprising: a mouse, a trackball, a tablet, a gesture detection device; wherein the data entry event [270] comprises parameters selected from a group comprising GUI (graphic user interface) cursor location, cursor movement data, pointing device button clicks, and a data entry timestamp [140].

It is another object of the present invention to disclose the system [100] mentioned above, wherein the data entry device [110] is a control panel comprising control input devices which provide one or more control inputs to the protected computing device [300], the control input devices selected from a group comprising switches, knobs, dials, buttons, sliders, wheels, pedals, steering wheels, levers, pull-throttles, and any combination thereof; wherein the data entry event [270] comprises parameters selected from a group comprising a control device input value and a data entry timestamp [140].

It is another object of the present invention to disclose the system [100] mentioned above, wherein the command verification module [130] processes data in the data entry database [250] for deriving a data entry pattern [280]; wherein the data entry pattern [280] indicates whether a human or non-human agency entered the data.

It is another object of the present invention to disclose the system [100] mentioned above, wherein the command verification module [130] further processes the data entry pattern [280] for confirming the identity of the specific human user [500] who entered the data.

It is another object of the present invention to disclose the system [100] mentioned above, wherein the data entry pattern [280] comprises a sequence of the data entry event [270] parameters and the pauses between the data entry events [270] as calculated from their respective times of data entry.\

It is another object of the present invention to disclose the system [100] mentioned above, further wherein the system [100] notifies the human user [500] of the occurrence of a non-authenticated command.

It is another object of the present invention to disclose the system [100] mentioned above, further wherein the system [100] notifies a third party of the occurrence of a non-authenticated command.

It is another object of the present invention to disclose the system [100] mentioned above, wherein the data entry device [110] comprises a microphone.

It is another object of the present invention to disclose the system [100] mentioned above, wherein the data entry device [110] comprises a motion picture camera.

It is another object of the present invention to disclose the system [100] mentioned above, wherein the data entry encoding module [120] comprises a computer program [200] executed by the protected computing device [300].

It is another object of the present invention to disclose the system [100] mentioned above, wherein the protected computing device [300] is selected from a group comprising: personal computers, workstations, mobile phones, smart phones, dedicated professional workstations, dedicated industrial workstations, tablet computers, and computerized gaming systems, general purpose servers, dedicated servers, and custom-configured, dedicated computer systems.

It is another object of the present invention to disclose the system [100] mentioned above, the computing device [300] selected to be either a smart phone or other mobile personal computer system running a mobile operating system, such as Android®, iOS®, or Windows Mobile®, wherein all memory storage operations and application ("app") downloads and execution calls undergo verification by means of association with specific user data entry events [270].

It is another object of the present invention to disclose the system [100] mentioned above, wherein the protected computing device [300] is configured to emulate a different computing system.

It is another object of the present invention to disclose the system [100] mentioned above, wherein the data entry encoding module [110] comprises a dedicated encoding device [160] separate from the protected computing device [300].

It is another object of the present invention to disclose the system [100] mentioned above, wherein the dedicated encoding device [160] is physically located externally to the protected computing device [300]; wherein the dedicated encoding device [160] is "removable" from the protected computing device [300].

It is another object of the present invention to disclose the system [100] mentioned above, wherein the dedicated encoding device [160] is physically integrated within, or otherwise permanently affixed to, the protected computing device [300].

It is another object of the present invention to disclose the system [100] mentioned above, wherein the command verification module [130] verifies processor commands [260], to be executed by the protected computing device [300], at a predetermined frequency.

It is another object of the present invention to disclose the system [100] mentioned above, wherein the command verification module [130] verifies processor commands [260], to be executed by the protected computing device [300], at randomly varying frequencies.

It is another object of the present invention to disclose the system [100] mentioned above, wherein the command verification module [130] continuously verifies processor commands [260] to be executed by the protected computing device [300].

It is another object of the present invention to disclose the system [100] mentioned above, wherein the command verification module [130] verifies computing functions at levels of processing higher than machine code.

It is another object of the present invention to disclose the system [100] mentioned above, wherein the command verification module [130] comprises:
  a. a computing module [150] for processing digital data;
  b. a non-volatile computer-readable medium (CRM) for storing a computer program [200];

wherein the computer program [200], stored on the CRM, instructs the computing module [150] to implement the authentication algorithm [210].

It is another object of the present invention to disclose the system [100] mentioned above, wherein the computing module [150] is implemented as a background software application run by the protected computing device [300].

It is another object of the present invention to disclose the system [100] mentioned above, wherein the computing module [150] is embodied by a separate, dedicated computing device [400] executing the authentication algorithm [210]; wherein the protected computing device [300] is configured to operate as a subordinate device to the dedicated computing device [400], such that the dedicated computing device [400] can prevent the protected computing device [300] from executing specific processor commands [260].

It is another object of the present invention to disclose the system [100] mentioned above, wherein the dedicated computing device [400] is embodied as an apparatus external to the protected computing device [300]; wherein the dedicated computing device [400] is "removable" from the protected computing device [300].

It is another object of the present invention to disclose the system [100] mentioned above, wherein the dedicated computing device [400] is physically integrated, "built-in," to the protected computing device [300].

It is another object of the present invention to disclose the system [100] mentioned above, wherein the system [100] is configured to protect a plurality of two or more protected computing devices [300].

It is another object of the present invention to disclose the system [100] mentioned above, wherein the plurality of two or more protected computing devices is networked within an organization.

It is another object of the present invention to disclose the system [100] mentioned above, wherein the command verification module [130], the data entry database [250], and the dedicated encoding device [160] are integrated onto a single, external, dedicated system protection device [500].

It is another object of the present invention to disclose the system [100] mentioned above, wherein the system protection device [500] is "plug-and-play," i.e., capable of being attached to, and recognized by, the protected computing device [300], such that the protection algorithm may be executed once the system protection device [500] shares a common data bus [190] with the protected computing device [300].

It is another object of the present invention to disclose the system [100] mentioned above, wherein the common data bus [190] is selected from a group of bus protocol standards comprising: USB, IDE, SCSI, SATA, Firewire (IEEE 1394), and Fibre Channel.

It is another object of the present invention to disclose the system [100] mentioned above, wherein the common data bus [190] is implemented by wireless means.

It is another object of the present invention to disclose the system [100] mentioned above, wherein the wireless means is selected from a group of communication technologies comprising: WiFi, Bluetooth, dedicated RF communication, and cellular telephony.

It is another object of the present invention to disclose the system [100] mentioned above, wherein the protected computing device [300] is a computer system dedicated to a transportation vehicle selected from a group comprising: ground-based motor vehicles, seacraft, and aircraft.

It is another object of the present invention to disclose a method for preventing a protected computing device [300] from executing unauthorized processor commands, the method comprising steps of providing:
  a. a data entry encoding module [120] for encoding data entered by a human user [500];
  b. a data entry database [250]; and
  c. a command verification module [130];

wherein data entered by the human user [500] via a data entry device [110] and the time of data entry, the "data entry timestamp" [140], are encoded by the data entry encoding module [120] as a data entry event [270] and stored in the data entry database [250];

wherein the command verification module [130] implements an authentication algorithm [210] for determining whether a processor command [260], to be executed by the protected computing device [300], originates from a trusted source;

wherein the command verification module [130] determines the trustworthiness of a processor command [260] as a function of processor command parameters selected from a group comprising:
  i. the type of processor command [260] to be executed by the protected computing device [300] (e.g., memory operation, data processing operation);
  ii. contextual parameters of the processor command [260], the parameters selected from a group comprising the specific computer process that called the processor command [260] (e.g., operating system, office productivity application, communication application, security application); and
  iii. association of the processor command [260] with one or more specific data entry events [270] encoded by the data encoding module [120] and stored in the data entry database [250];

wherein the command verification module [130] allows authenticated processor commands to be executed by the protected computing device [300];

wherein the command verification module [130] prevents the protected computing device [300] from executing processor commands [260] determined to be non-authenticated.

It is another object of the present invention to disclose the method mentioned above, further comprising steps of the data entry encoding module [120] encrypts the data entry event [270] data; further wherein the data command verification module [130] decrypts the encrypted data entry event [270] as trusted data entered by a human user [500] by means of the data entry device [110].

It is another object of the present invention to disclose the method mentioned above, further comprising the step of selecting the encryption method from a group comprising public-key encryption and shared-key encryption.

It is another object of the present invention to disclose the method mentioned above, further comprising the step of selecting a keyboard as the data entry device [110] and configuring the data entry event [270] to comprise keystroke identification and a data entry timestamp [140].

It is another object of the present invention to disclose the method mentioned above, further comprising the step of selecting the data entry device [110] from a group of pointing devices comprising: a mouse, a trackball, a tablet, a gesture detection device; further comprising steps of configuring the data entry event [270] to comprise parameters selected from a group comprising GUI (graphic user interface) cursor location, cursor movement data, and a data entry timestamp [140].

It is another object of the present invention to disclose the method mentioned above, further comprising the step of selecting the data entry device [110] as a control panel comprising control input devices which provide one or more control input signals to the protected computing device [300], the control input devices selected from a group comprising switches, knobs, dials, buttons, sliders, wheels, pedals, steering wheels, levers, pull-throttles, and any combination thereof; further comprising steps of configuring the data entry event [270] to comprises parameters selected from a group comprising control input value and a data entry timestamp [140].

It is another object of the present invention to disclose the method mentioned above, further comprising steps of the command verification module [130] processing data in the data entry database [250] for deriving a data entry pattern [280]; the data entry pattern [280] indicating whether a human or non-human agency entered the data.

It is another object of the present invention to disclose the method mentioned above, further comprising steps of the command verification module [130] processing the data entry pattern [280] for confirming the identity of the specific human user [500] who entered the data.

It is another object of the present invention to disclose the method mentioned above, further comprising steps of configuring the data entry pattern [280] to comprise a sequence of the data entry event [270] parameters and the pauses between the data entry events [270] as calculated from their respective times of data entry.

It is another object of the present invention to disclose the method mentioned above, further comprising the step of notifying the human user [500] of the occurrence of a non-authenticated command.

It is another object of the present invention to disclose the method mentioned above, further comprising the step of notifying a third party of the occurrence of a non-authenticated command.

It is another object of the present invention to disclose the method mentioned above, further comprising the step of selecting a microphone as the data entry device [110].

It is another object of the present invention to disclose the method mentioned above, further comprising the step of selecting a motion picture camera as the data entry device [110].

It is another object of the present invention to disclose the method mentioned above, further comprising steps of implementing the data entry encoding module [120] as a computer program [200] executed by the protected computing device [300].

It is another object of the present invention to disclose the method mentioned above, further comprising steps of selecting the protected computing device [300] from a group comprising: personal computers, workstations, mobile phones, smart phones, dedicated professional workstations, dedicated industrial workstations, tablet computers, and computerized gaming systems, general purpose servers, dedicated servers, and custom-configured, dedicated computer systems.

It is another object of the present invention to disclose the method mentioned above, further comprising steps of selecting the computing device [300] to be either a smart phone or other mobile personal computer system running a mobile operating system, such as Android®, iOS®, or Windows Mobile®; verifying all memory storage operations and application ("app") downloads and execution calls by means of association with specific user data entry events.

It is another object of the present invention to disclose the method mentioned above, further comprising steps of select-ing the protected computing device [300] as a device configured to emulate a different computing system.

It is another object of the present invention to disclose the method mentioned above, further comprising the step of selecting the data entry encoding module [110] as a dedicated encoding device [160] separate from the protected computing device [300].

It is another object of the present invention to disclose the method mentioned above, further comprising the step of physically locating the dedicated encoding device [160] externally to the protected computing device [300]; such that the dedicated encoding device [160] is "removable" from the protected computing device [300].

It is another object of the present invention to disclose the method mentioned above, further comprising the step of physically integrating the dedicated encoding device [160] as a fixed part of the protected computing device [300].

It is another object of the present invention to disclose the method mentioned above, further comprising steps of the command verification module [130] verifying processor commands [260], to be executed by the protected computing device [300], at a predetermined frequency.

It is another object of the present invention to disclose the method mentioned above, further comprising steps of the command verification module [130] verifying processor commands [260], to be executed by the protected computing device [300], at randomly varying frequencies.

It is another object of the present invention to disclose the method mentioned above, further comprising steps of the command verification module [130] continuously verifying processor commands [260] to be executed by the protected computing device [300].

It is another object of the present invention to disclose the method mentioned above, further comprising steps of the command verification module [130] verifying computing functions at levels of processing higher than machine code.

It is another object of the present invention to disclose the method mentioned above, wherein the command verification module [130] comprises:
  a. a computing module [150] for processing digital data;
  b. a non-volatile computer-readable medium (CRM) for storing a computer program [200];
wherein the computer program [200], stored on the CRM, instructs the computing module [150] to implement the authentication algorithm [210].

It is another object of the present invention to disclose the method mentioned above, further comprising steps of implementing the computing module [150] as a background software application run by the protected computing device [300].

It is another object of the present invention to disclose the method mentioned above, further comprising steps of implementing the computing module [150] as a separate, dedicated computing device [400] executing the authentication algorithm [210]; configuring the protected computing device [300] to operate as a subordinate device to the dedicated computing device [400], such that the dedicated computing device [400] can prevent the protected computing device [300] from executing specific processor commands [260].

It is another object of the present invention to disclose the method mentioned above, further comprising steps of configuring the dedicated computing device [400] as an apparatus external to the protected computing device [300]; configuring the dedicated computing device [400] to be "removable" from the protected computing device [300].

It is another object of the present invention to disclose the method mentioned above, further comprising steps of physically integrating the dedicated computing device [400] as a fixed part of the protected computing device [300].

It is another object of the present invention to disclose the method mentioned above, further comprising steps of protecting a plurality of two or more protected computing devices [300].

It is another object of the present invention to disclose the method mentioned above, further comprising steps of selecting the plurality of two or more protected computing devices as being networked within an organization.

It is another object of the present invention to disclose the method mentioned above, further comprising steps of integrating the command verification module [130], the data entry database [250], and the dedicated encoding device [160] onto a single, external, dedicated system protection device [500].

It is another object of the present invention to disclose the method mentioned above, further comprising steps of configuring the system protection device [500] to be "plug-and-play," i.e., capable of being attached to, and recognized by, the protected computing device [300], such that the protection algorithm may be executed once the system protection device [500] shares a common data bus [190] with the protected computing device [300].

It is another object of the present invention to disclose the method mentioned above, further comprising the step of selecting the common data bus [190] is from a group of bus protocol standards comprising: USB, IDE, SCSI, SATA, Firewire (IEEE 1394), and Fibre Channel.

It is another object of the present invention to disclose the method mentioned above, further comprising the step of implementing the common data bus [190] by wireless means.

It is another object of the present invention to disclose the method mentioned above, further comprising steps of selecting the wireless means from a group of communication technologies comprising: WiFi, Bluetooth, dedicated RF communication, and cellular telephony.

It is another object of the present invention to disclose the method mentioned above, further comprising steps of selecting the protected computing device [300] from a group of computer systems dedicated transportation vehicles, the group comprising: ground-based motor vehicles, seacraft, and aircraft.

BRIEF DESCRIPTION OF THE FIGURES

In order to understand the invention and to see how it may be implemented in practice, and by way of non-limiting example only, the disclosure will provide details in the subsequent description of preferred embodiments with reference to the following figures, wherein.

DETAILED DESCRIPTION OF THE INVENTION

Figure 1:
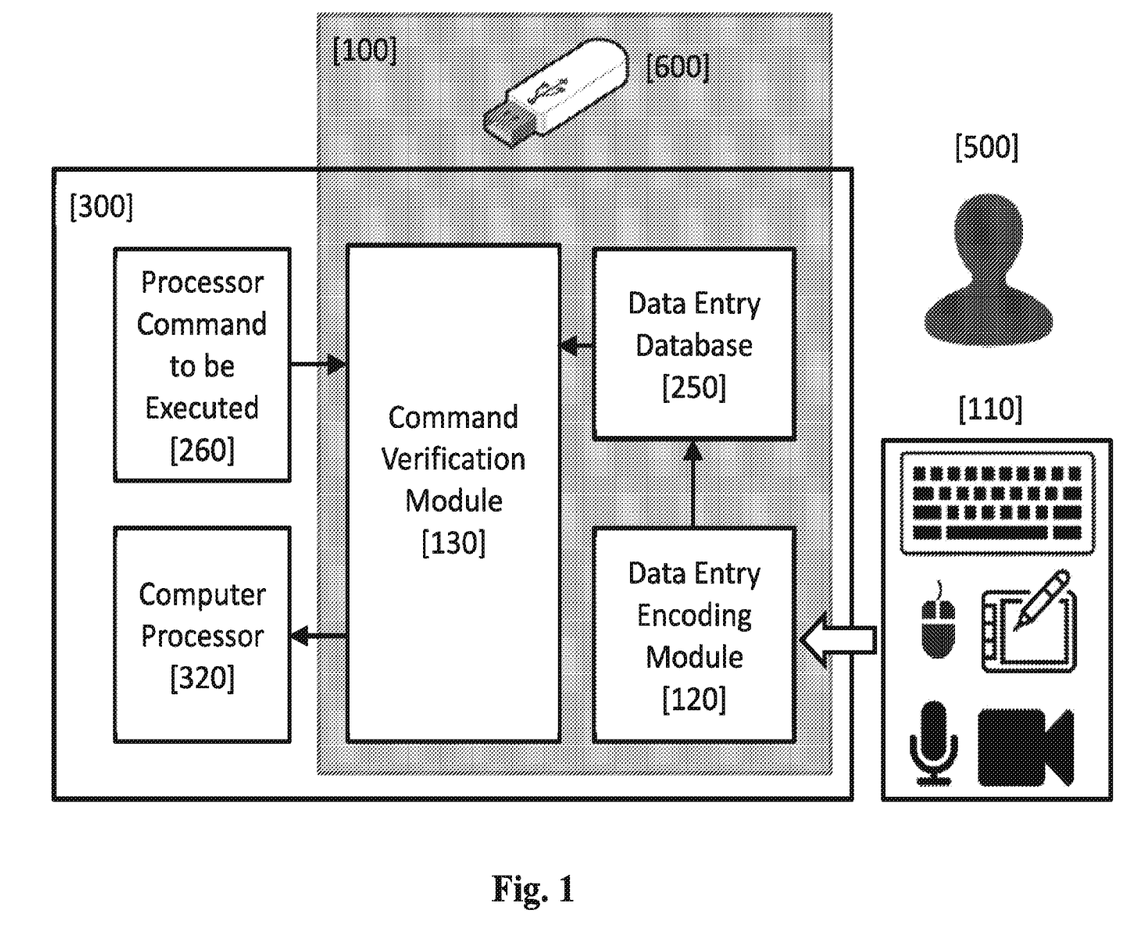
FIG. 1 is a conceptual drawing of an embodiment of the invention.
Figure 2A:
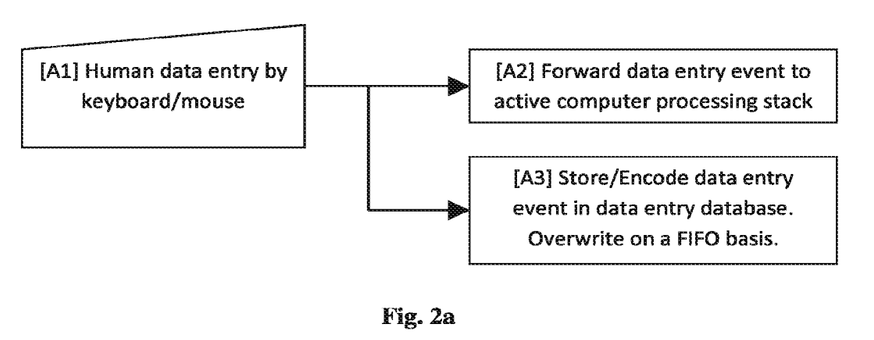
FIGS. 2a and 2b are flowcharts describing the parallel processes of human user data entry (FIG. 2a) and processor command verification (FIG. 2b).

According to the flowchart of FIG. 2a, [A1] the human user enters data by means of a keyboard or mouse. In this particular embodiment, [A2] the human-entered data is forwarded to an active computer processing stack and concurrently [A3] stored and encoded in a data entry database, where data is over-written on a first-in-first-out, or FIFO, basis.

Figure 2B:
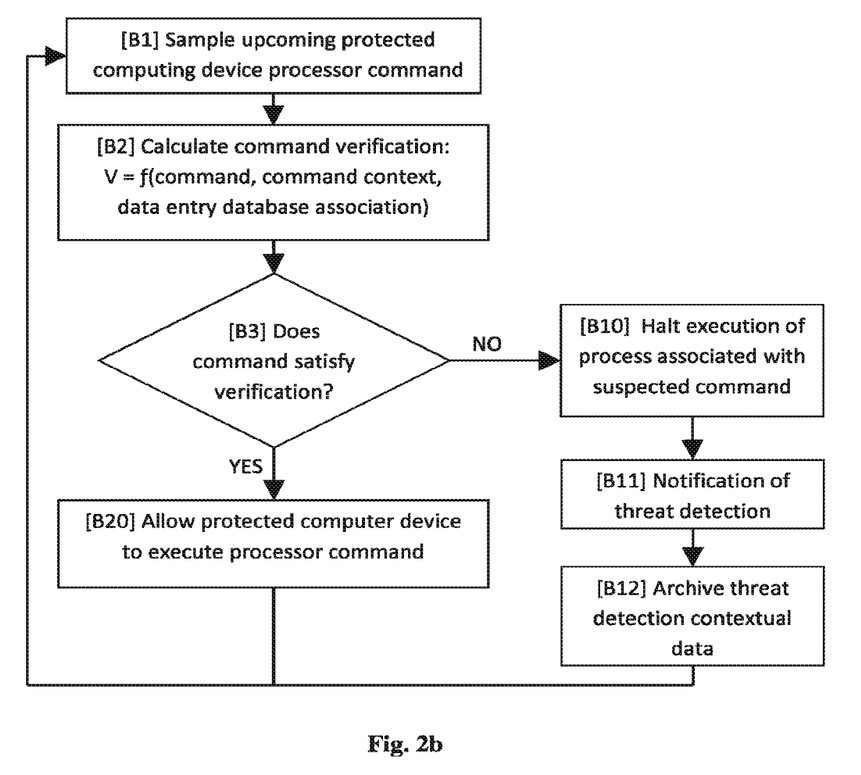

According to the flowchart of FIG. 2b, [B1] the system [100] samples an upcoming processor command from the processing stack. [B2] the system [100] then verifies the command as authentic as a function of the command itself, the command's operational context, and association of the command with a data entry event of the user, as retrieved from the data entry database. [B3] If the command is verified, it is [B20] forwarded to be executed by the protected device's processor. If the command is not verified, [B10] the process associated with the suspected command is halted, [B11] a threat detection notification is issued, and [B12] contextual data identifying the threat is recorded in a threat detection archive.

It is important to note that the presence of this system and method does not preclude the use of additional malware detection and protection systems.

An embodiment of the command verification module's [260] authentication algorithm [210] includes a categorization of the operating system's kernel functions according to a) functions associated with user data entry, b) functions associated with automated processes, and c) functions associated with either user data entry or automated processes.

A key component of the method of the invention is the strategy of checking the randomness of data entry. Randomness characterizes human use of a keyboard and a mouse because of the variation, in both frequency and duration, of pauses and actions. Malicious code, in contrast, does not have a comparable element of randomness in its system entry.

It is according to a preferred embodiment of the current invention to present a system [100] and a method wherein the data entry encoding module [120] encrypts the data entry event [270] data; further wherein the data command verification module [130] decrypts the encrypted data entry event [270] as trusted data entered by a human user [500] by means of the data entry device [110].

It is according to a preferred embodiment of the current invention to present a system [100] and a method wherein the encryption method is selected from a group comprising public-key encryption and shared-key encryption.

It is according to a preferred embodiment of the current invention to present a system [100] and a method wherein the data entry device [110] comprises a keyboard; wherein the data entry event [270] comprises parameters selected from a group comprising keystroke identification and a data entry timestamp [140].

It is according to a preferred embodiment of the current invention to present a system [100] and a method wherein the data entry device [110] is selected from a group of pointing devices comprising: a mouse, a trackball, a tablet, a gesture detection device; wherein the data entry event [270] comprises parameters selected from a group comprising GUI (graphic user interface) cursor location, cursor movement data, pointing device button clicks, and a data entry timestamp [140].

It is according to a preferred embodiment of the current invention to present a system [100] and a method wherein the data entry device [110] is a control panel comprising control input devices which provide one or more control inputs to the protected computing device [300], the control input devices selected from a group comprising switches, knobs, dials, buttons, sliders, wheels, pedals, steering wheels, levers, pull-throttles, and any combination thereof; wherein the data entry event [270] comprises parameters selected from a group comprising a control device input value and a data entry timestamp [140].

It is noted that the data entry device [110] of an embodiment of the invention can include any and control input device having a physically measurable value, whether that value is already a digital electronic value or whether the value requires analog-to-digital conversion or other signal processing in order to be input to the protected computing device [300].

It is according to a preferred embodiment of the current invention to present a system [100] and a method wherein the command verification module [130] processes data in the data entry database [250] for deriving a data entry pattern [280]; wherein the data entry pattern [280] indicates whether a human or non-human agency entered the data.

By creating a database of data input device behavior, consisting of recorded patterns of device usage, and applying a regression model, it is possible to determine the randomness of data entry activity. It is furthermore possible to identify individual users on the basis of these behavioral patterns.

It is according to a further embodiment of the current invention to present a system [100] and a method wherein the command verification module [130] further processes the data entry pattern [280] for confirming the identity of the specific human user [500] who entered the data.

It is according to a preferred embodiment of the current invention to present a system [100] and a method wherein the data entry pattern [280] comprises a sequence of the data entry event [270] parameters and the pauses between the data entry events [270] as calculated from their respective times of data entry.

It is according to a preferred embodiment of the current invention to present a system [100] and a method wherein the system [100] notifies the human user [500] of the occurrence of a non-authenticated command.

It is according to a further embodiment of the current invention to present a system [100] and a method wherein the system [100] notifies a third party of the occurrence of a non-authenticated command.

It is according to a further embodiment of the current invention to present a system [100] and a method wherein the data entry device [110] comprises a microphone.

It is according to a further embodiment of the current invention to present a system [100] and a method wherein the data entry device [110] comprises a motion picture camera.

It is according to a preferred embodiment of the current invention to present a system [100] and a method wherein the data entry encoding module [120] comprises a computer program [200] executed by the protected computing device [300].

It is according to a preferred embodiment of the current invention to present a system [100] and a method wherein the protected computing device [300] is selected from a group comprising: personal computers, workstations, mobile phones, smart phones, dedicated professional workstations, dedicated industrial workstations, tablet computers, and computerized gaming systems, general purpose servers, dedicated servers, and custom-configured, dedicated computer systems.

The need for the current invention becomes especially acute for systems which regularly use public, unsecured networks and servers. Smartphones and other mobile computing devices, such as tablets, regularly rely on a multitude of downloaded applications, or mobile "apps," for special-purpose data communication and/or processing. Apps are easily developed and therefore specific apps have been released by merchants, educational institutions, non-profits organizations, government bodies, service providers, and other entities. However, given their wide-ranging proliferation via unsecured communication networks and servers, apps may be more vulnerable to carrying malicious code.

Mobile operating systems, such as Google®'s Android®, Apple®'s iOS®, and Microsoft®'s Windows Mobile®, are designed especially for devices, like smartphones and tablets, which are optimized to function in an externally communicative mode. They might interact on a regular basis with external data-storage entities such as app repositories.

Given the risks associated with mobile devices exchanging data, especially executable code, with unsecured data infrastructure, the current invention verifies and monitors commands to be executed by checking these commands with their association to data entry events.

The data entry events may be associated with data entered on the mobile device's built-in keyboard, including a touch-screen keyboard implementation.

It is according to a preferred embodiment of the current invention to present a system [100] and a method, the computing device [300] selected to be either a smart phone or other mobile personal computer system running a mobile operating system, such as Android®, iOS®, or Windows Mobile®, wherein all memory storage operations and application ("app") downloads and execution calls undergo verification and monitoring by means of association with specific user data entry events [270].

Computer emulators are software applications which enable a computing device to behave like, or "emulate," a different computing device. In many instances, emulators configure computers systems to behave like older computers in order to execute older programs which may not be compatible with a newer operating system. In other instances, especially in aerospace and military applications, emulators may be used for emulating specialized simulations and specialized computer equipment. As emulators operate by implementing an additional layer of data processing hierarchy, they may also provide additional potential for malware.

It is according to a further embodiment of the current invention to present a system [100] and a method wherein the protected computing device [300] is configured to emulate a different computing system.

It is according to a preferred embodiment of the current invention to present a system [100] and a method wherein the data entry encoding module [110] comprises a dedicated encoding device [160] separate from the protected computing device [300].

It is according to a preferred embodiment of the current invention to present a system [100] and a method wherein the dedicated encoding device [160] is physically located externally to the protected computing device [300]; wherein the dedicated encoding device [160] is "removable" from the protected computing device [300].

It is according to a further embodiment of the current invention to present a system [100] and a method wherein the dedicated encoding device [160] is physically integrated within, or otherwise permanently affixed to, the protected computing device [300].

It is according to a further embodiment of the current invention to present a system [100] and a method wherein the command verification module [130] verifies processor commands [260], to be executed by the protected computing device [300], at a predetermined frequency.

It is according to a preferred embodiment of the current invention to present a system [100] and a method wherein the command verification module [130] verifies processor commands [260], to be executed by the protected computing device [300], at randomly varying frequencies.

It is according to a further embodiment of the current invention to present a system [100] and a method wherein the command verification module [130] continuously verifies processor commands [260] to be executed by the protected computing device [300].

It is according to a further embodiment of the current invention to present a system [100] and a method wherein the command verification module [130] verifies computing functions at levels of processing higher than machine code.

It is according to a preferred embodiment of the current invention to present a system [100] and a method wherein the command verification module [130] comprises:
   a. a computing module [150] for processing digital data;
   b. a non-volatile computer-readable medium (CRM) for storing a computer program [200];
wherein the computer program [200], stored on the CRM, instructs the computing module [150] to implement the authentication algorithm [210].

It is according to a preferred embodiment of the current invention to present a system [100] and a method wherein the computing module [150] is implemented as a background software application run by the protected computing device [300].

It is according to a preferred embodiment of the current invention to present a system [100] and a method wherein the computing module [150] is embodied by a separate, dedicated computing device [400] executing the authentication algorithm [210]; wherein the protected computing device [300] is configured to operate as a subordinate device to the dedicated computing device [400], such that the dedicated computing device [400] can prevent the protected computing device [300] from executing specific processor commands [260].

It is according to a preferred embodiment of the current invention to present a system [100] and a method wherein the dedicated computing device [400] is embodied as an apparatus external to the protected computing device [300]; wherein the dedicated computing device [400] is "removable" from the protected computing device [300].

It is according to a preferred embodiment of the current invention to present a system [100] and a method wherein the dedicated computing device [400] is physically integrated, "built-in," to the protected computing device [300].

It is according to a preferred embodiment of the current invention to present a system [100] and a method wherein the system [100] is configured to protect a plurality of two or more protected computing devices [300].

It is according to a further embodiment of the current invention to present a system [100] and a method wherein the plurality of two or more protected computing devices is networked within an organization.

It is according to a preferred embodiment of the current invention to present a system [100] and a method wherein the command verification module [130], the data entry database [250], and the dedicated encoding device [160] are integrated onto a single, external, dedicated system protection device [500].

It is according to a preferred embodiment of the current invention to present a system [100] and a method wherein the system protection device [500] is "plug-and-play," i.e., capable of being attached to, and recognized by, the protected computing device [300], such that the protection algorithm may be executed once the system protection device [500] shares a common data bus [190] with the protected computing device [300].

It is according to a preferred embodiment of the current invention to present a system [100] and a method wherein the common data bus [190] is selected from a group of bus protocol standards comprising: USB, IDE, SCSI, SATA, Firewire (IEEE 1394), and Fibre Channel.

It is according to a further embodiment of the current invention to present a system [100] and a method wherein the common data bus [190] is implemented by wireless means.

It is according to a preferred embodiment of the current invention to present a system [100] and a method wherein the wireless means is selected from a group of communication technologies comprising: WiFi, Bluetooth, dedicated RF communication, and cellular telephony.

A field of mobile computing and communication that may present especially critical system protection challenges is that of automotive computing. Automotive vehicle manufacturers and service providers are increasingly designing operational modules to be controlled by computer means and to include networked communication means.

It is according to a preferred embodiment of the current invention to present a system [100] and a method wherein the protected computing device [300] is a computer system dedicated to a transportation vehicle selected from a group comprising: ground-based motor vehicles, seacraft, and aircraft.

EXAMPLES

The following described example embodiments are presented for purposes of clarification and should not be construed as limiting the inventive system or method for preventing unauthorized computer processing to specific applications or circumstances.

Example 1: Financial Institution

Financial institutions control, electronically transfer, and maintain records of billions of dollars' worth of monetary and other assets on a daily basis. Their ability to do these things depends greatly on their networked connectivity to remote offices and to the Internet in general, as well as on their ability to keep their computing and digital storage facilities secure from unauthorized, external infiltration.

Computer "crackers," are individuals and groups who regularly infiltrate otherwise secure, protected, networked servers, including those of financial institutions and governments. Crackers often obtain extremely sensitive information during these infiltrations, and sometimes maliciously cripple the target entities' ability to operate their digital operations. Crackers have become increasingly sophisticated and adept at breaching digital data security safeguards.

Systems are often breached and maliciously attacked when their security protocols have been "spoofed," when they operate in a mode in which an authorized user is erroneously presumed to be present and providing authorized commands and/or appropriate data input.

Given the difficulty of safeguarding computer systems which are (a) extremely complex and (b) networked globally, these systems must be checked not only at their "points of entry," i.e., their authorization points, but also during their secure operations. Furthermore, a critical advantage would be had if continuous security safeguards included the verification of commands resulting at the initiative of a confirmed, present human user.

An example embodiment of the present invention protects a financial institution computer against infiltration by a remote, unauthorized entity. The invention comprises a USB dongle [600] containing an output USB port for connection with the protected computer, a microprocessor, a data communication bus, read-only memory, a writeable flash memory component, a program pre-installed on the read-only memory, and a USB input port compatible with a USB keyboard or mouse data entry device. The dongle's components are configured to implement a dedicated data encoding module [120], a dedicated data entry database [250], and a command verification module [130] in the following manner:

1. Data entered by a human user [500] via a keyboard [110] is encoded by the data entry encoding module [120] as a data entry event [270] and stored in a user data entry database [250];
2. The command verification module [130] instructs the protected computer [300] to forward to the command verification module [130] one or more processor commands awaiting execution by the protected computer;
3. The command verification module [130] determines whether a processor command [260], to be executed by the protected computing device [300], originates from a trusted source; the determination of trustworthiness is a function of the following factors:
    a. the type of processor command [260] to be executed by said protected computing device [300] (e.g., memory operation, data processing operation);
    b. contextual parameters of said processor command [260]; contextual parameters selected from a group comprising:
        i. the specific computer process that called said processor command [260] (e.g., operating system, office productivity application, communication application, security application); and
        ii. the time when the processor command [260] is to be executed; and
    c. association of the processor command [260] with a specific data entry event [270] encoded by the data encoding module [120] and stored in the data entry database [250];
4. If the command awaiting execution is determined to be trustworthy, the command verification module [130] instructs the protected computer to execute it. Otherwise, if the command was determined to be untrustworthy, the command verification module [130] instructs the protected computer to (i) halt the command's associated process, (ii) notify predetermined entities of a detected threat, and (iii) archive contextual data regarding the suspicious command.
5. Step 1 is performed on a continuous FIFO (first in first out) basis, with new data entry events [270] overwriting old ones once the data entry database's capacity is full; steps 2-4 are repeated according to a randomly varied frequency.

Example 2: Secure Cellular Phone Operation

Cellular telephones have rapidly replaced the laptop as the device of choice for personal communication and computing. A great many people use their cell phones for communicating by email, storing digital pictures, storing personal records, business correspondence, and conducting financial transactions. Many users store the bulk of their passwords in their web browser data, which may be accessed at any time the cellular phone is "logged in." In short, for many cellular phone users, access to their mobile device equates access to every financial asset they own or influence, access to potentially confidential business intelligence, and access to any confidential personal record or issue discussed on SMS or email.

This reality becomes painfully clear when a person loses his device through theft, accident, or misplacement. When this occurs, the cell phone's rightful user is motivated and informed to act quickly to safeguard his confidential information. However, a less apparent, but potentially much more harmful, phenomenon occurs when a cell phone has been "cracked" by a malicious hacker—without the immediate knowledge of the mobile device's owner or rightful user. In this event, a malicious agent has the capability not only of exploiting the information already resident on the mobile device, but also of continuing to maliciously use the device remotely.

The consequences of this situation can be extremely dire as a malicious agent might steal the identity of the device's rightful user for financial gain (and/or the financial ruin of the rightful user), ruin the rightful user's reputation, or continuously and illegally monitor the rightful user. Unauthorized cell phone monitoring has proven to be a critical problem even among high level officials of the most advanced countries.

Cell phones are (a) complex, (b) networked globally, (c) often networked into insecure WiFi "hot spots," and (d) often configured for use on multiple social and other networks of varying levels of security. As such, cell phone operations must be monitored on a regular or continuous basis. A critical advantage would be had if continuous security safeguards included the verification of commands resulting at the initiative of a confirmed, present human user.

An example embodiment of the present invention protects a smartphone computer against infiltration by a remote, unauthorized entity. The invention comprises a SD flash memory comprising a read-write partition and a read only memory (ROM) partition with a pre-installed program. The program configures the smartphone to implement a data encoding module [120], a data entry database [250], and a command verification module [130] in the following manner:

1. Data entered by a human user [500] via the smartphone's keyboard interface [110] is encoded by the data entry encoding module [120] as a data entry event [270] and stored in the data entry database [250];
2. The command verification module [130] instructs the smartphone [300] to provide the command verification module [130] with one or more processor commands awaiting execution by the smartphone's processor;
3. The command verification module [130] determines whether a processor command [260], to be executed by the smartphone's [300] processor, originates from a trusted source; the determination of trustworthiness is a function of the following factors:
    a. the type of processor command [260] to be executed by said protected computing device [300] (e.g., memory operation, data processing operation);
    b. contextual parameters of said processor command [260]; contextual parameters selected from a group comprising:
        i. the specific computer process that called said processor command [260] (e.g., operating system, office productivity application, communication application, security application); and
ii. the time when the processor command [260] is to be executed; and
c. association of the processor command [260] with a specific data entry event [270] encoded by the data encoding module [120] and stored in the data entry database [250].
4. If the command awaiting execution is determined to be trustworthy, the command verification module [130] instructs the smartphone to execute it. Otherwise, if the command was determined to be untrustworthy, the command verification module [130] instructs the smartphone to (i) halt the command's associated process, (ii) notify the user [500] of a detected threat, and (iii) archive contextual data regarding the suspicious command for the user's reference.
5. Step 1 is performed on a continuous FIFO (first in first out) basis, with new data entry events [270] overwriting old ones once the data entry database's allotted capacity is full; steps 2-4 are repeated according to a randomly varied frequency.

What is claimed:

1. One or more non-transitory computer-readable media (CRM), configured with stored instructions for one or more processors to execute a system for preventing a protected computing device from executing unauthorized processor commands, said system comprising:
a data entry encoding module for encoding data entered by a human user;
a data entry database; and
a command verification module;
wherein data entered by said human user via a data entry device and a time of data entry are encoded by said data entry encoding module as a data entry event and stored in said data entry database;
wherein said command verification module implements an authentication algorithm for determining whether a processor command, to be executed by said protected computing device, originates from a trusted source;
wherein said command verification module determines the trustworthiness of the processor command as a function of processor command parameters selected from the group consisting of:
i. a type of processor command to be executed by said protected computing device;
ii. contextual parameters of said processor command, said contextual parameters comprising a specific computer process that called said processor command; and
iii. association of said processor command with one or more specific data entry events encoded by said data encoding module and stored in said data entry database; and
wherein said command verification module allows authenticated processor commands to be executed by said protected computing device;
wherein said command verification module prevents said protected computing device from executing processor commands determined to be non-authenticated; and
wherein said command verification module comprises a first said CRM and processes data in said data entry database for deriving a data entry pattern; said data entry pattern indicates whether a human or non-human agency entered said data.

2. The one or more CRM of claim 1, wherein said data entry device comprises a keyboard; wherein said data entry event comprises parameters consisting of keystroke identification and a data entry timestamp.

3. The one or more CRM of claim 1, wherein said data entry device is selected from the group of pointing devices consisting of a mouse, a trackball, a tablet, a joystick, and a gesture detection device; wherein said data entry event comprises parameters selected from the group consisting of graphic user interface (GUI) cursor location, cursor movement data, pointing device button clicks, and a data entry timestamp.

4. The one or more CRM of claim 1, wherein said system is configured to protect a plurality of two or more protected computing devices.

5. The one or more CRM of claim 4, wherein said plurality of two or more protected computing devices is networked within an organization.

6. The one or more CRM of claim 1, wherein said command verification module further processes said data entry pattern for identifying the human user who entered said data.

7. The one or more CRM of claim 1, wherein said data entry pattern comprises a sequence of said data entry event parameters and pauses between said data entry events as calculated from their respective times of data entry.

8. The one or more CRM of claim 1, wherein said data entry encoding module comprises a dedicated encoding device separate from said protected computing device and said dedicated encoding device is physically located externally to said protected computing device; wherein said dedicated encoding device is removable from said protected computing device.

9. The one or more CRM of claim 1, wherein said command verification module verifies processor commands, to be executed by said protected computing device, at a predetermined frequency.

10. The one or more CRM of claim 1, wherein said command verification module verifies processor commands, to be executed by said protected computing device, at randomly varying frequencies.

11. The one or more CRM of claim 1, wherein said command verification module comprises:
a. a computing module for processing digital data;
b. a non-volatile computer-readable medium (CRM) for storing a computer program;
wherein said computer program, stored on said CRM, instructs said computing module to implement said authentication algorithm; and
wherein said computing module is embodied by a separate, dedicated computing device executing said authentication algorithm; and
wherein said protected computing device is configured to operate as a subordinate device to said dedicated computing device, such that said dedicated computing device prevents said protected computing device from executing specific processor commands; and
wherein said dedicated computing device is embodied as an apparatus external to said protected computing device; wherein said dedicated computing device is removable from said protected computing device.

12. A method for preventing a protected computing device from executing unauthorized processor commands, said method comprising:
a. providing a data entry encoding module for encoding data entered by a human user;
b. said human user, via a data entry device and a time of data entry, entering data for encoding as a data entry event and stored in a data entry database;

c. implementing, via a command verification module, an authentication algorithm for determining whether a processor command, to be executed by said protected computing device, originates from a trusted source;

d. determining, via the trustworthiness of the processor command as a function of processor command parameters selected from the group consisting of:

i. a type of processor command to be executed by said protected computing device;

ii. contextual parameters of said processor command, said contextual parameters comprising a specific computer process that called said processor command; and iii. association of said processor command with one or more specific data entry events encoded by said data encoding module and stored in said data entry database, allowing, via said command verification module, authenticated processor commands to be executed by said protected computing device;

preventing, via said command verification module, said protected computing device from executing processor commands determined to be non-authenticated; and processing data in said data entry database, via one of one or more CRM of said command verification module, for deriving a data entry pattern in which said data entry pattern indicates whether a human or non-human agency entered said data.

13. The method of claim 12, further comprising said command verification module processing said data entry pattern for identifying the human user who entered said data.

14. The method of claim 12, further comprising configuring said data entry pattern to comprise a sequence of said data entry event parameters and pauses between said data entry events as calculated from their respective times of data entry.

15. The method of claim 12, further comprising said command verification module verifying processor commands, to be executed by said protected computing device, at a predetermined frequency.

16. The method of claim 12, further comprising said command verification module verifying processor commands, to be executed by said protected computing device, at randomly varying frequencies.

17. One or more non-transitory computer-readable media (CRM), configured with stored instructions for one or more processors to execute a system for preventing a protected computing device from executing unauthorized processor commands, said system comprising:

a. a data entry encoding module for encoding data entered by a human user;

b. a data entry database; and c. a command verification module;

wherein data, entered by said human user via a data entry device and a time of data entry are encoded by said data entry encoding module as a data entry event and stored in said data entry database; and wherein said command verification module implements an authentication algorithm for determining whether a processor command, to be executed by said protected computing device, originates from a trusted source; and wherein said command verification module determines the trustworthiness of a processor command as a function of processor command parameters selected from the group consisting of:

i. a type of processor command to be executed by said protected computing device;

ii. contextual parameters of said processor command, said contextual parameters comprising a computer process that called said processor command; and iii. association of said processor command with one or more specific data entry events encoded by said data encoding module and stored in said data entry database; and wherein said command verification module allows authenticated processor commands to be executed by said protected computing device; and wherein said command verification module prevents said protected computing device from executing processor commands determined to be non-authenticated; and wherein said system further comprises an emulator module comprising a second CRM of said one or more CRM, configured to emulate the computing device with an operating system different than an operating system of said protected computing device.

18. The one or more CRM of claim 17, wherein said emulating modules has attributes of one or more of a. said emulated operating system is older that said protected computing device operating system; and b. said emulating module emulates a specialized simulation or specialized computer equipment.

* * * * *